(12) United States Patent
Tanizawa (10) Patent No.: US 6,747,668 B2
(45) Date of Patent: Jun. 8, 2004

(54) IMAGE REDUCING DEVICE AND METHOD

(75) Inventor: Toshihiro Tanizawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 229 days.

(21) Appl. No.: 09/828,804

(22) Filed: Apr. 10, 2001

(65) Prior Publication Data

US 2001/0028358 A1 Oct. 11, 2001

(30) Foreign Application Priority Data

Apr. 10, 2000 (JP) ........................................ 2000-107759

(51) Int. Cl.[7] .............................................. G06F 15/62
(52) U.S. Cl. ....................... 345/660; 345/673; 345/665; 345/666; 345/667; 345/670
(58) Field of Search ................................ 345/665–666, 345/660, 611–616, 589, 581, 670, 673, 667

(56) References Cited

U.S. PATENT DOCUMENTS

| | | | | |
|---|---|---|---|---|
| 4,412,252 A | * | 10/1983 | Moore et al. ................ | 348/580 |
| 5,335,295 A | * | 8/1994 | Ferracini et al. ............ | 382/298 |
| 5,428,461 A | * | 6/1995 | Yamashita et al. .......... | 358/451 |
| 5,491,769 A | * | 2/1996 | Moller ........................ | 345/670 |
| 5,790,708 A | * | 8/1998 | Delean ....................... | 382/270 |
| 5,790,714 A | * | 8/1998 | McNeil et al. .............. | 382/300 |
| 5,831,624 A | * | 11/1998 | Tarolli et al. ................ | 345/587 |
| 6,141,061 A | * | 10/2000 | Takeuchi .................... | 348/581 |
| 6,181,834 B1 | * | 1/2001 | Li et al. ...................... | 382/298 |
| 6,229,521 B1 | * | 5/2001 | Yip ............................. | 345/611 |
| 6,252,576 B1 | * | 6/2001 | Nottingham ................ | 345/660 |
| 6,252,578 B1 | * | 6/2001 | Hsieh et al. ................. | 345/611 |
| 6,272,260 B1 | * | 8/2001 | Furukawa et al. .......... | 382/261 |
| 6,348,929 B1 | * | 2/2002 | Acharya et al. ............ | 345/660 |
| 6,384,831 B1 | * | 5/2002 | Nakamura et al. .......... | 345/503 |
| 6,392,711 B1 | * | 5/2002 | Kesatoshi ................... | 348/581 |
| 6,496,186 B1 | * | 12/2002 | Deering ...................... | 345/419 |

* cited by examiner

Primary Examiner—Michael Razavi
Assistant Examiner—Daniel J Chung
(74) Attorney, Agent, or Firm—Birch, Stewart, Kolasch & Birch LLP (57) ABSTRACT

An image reducing device comprises a simple-averaging device that calculates a simple average of data of pixels of each simple-averaging area of original image data to acquire a pixel of middle image data, and a weighted-averaging device that multiplies data of pixels of the middle image data that are adjacent to a pixel of reduced image data by weight coefficients according to positions of the pixel of the reduced image data and the pixels of the middle image data to acquire the pixel of the reduce image data. In this method, the weighted-averaging is performed after the number of pixels are reduced by the simple-averaging, and this can obtain the reduced image of high quality without overloading the software and hardware. In addition, the edging can be easily performed at the same time as the weighted-averaging.

12 Claims, 7 Drawing Sheets

○ PIXELS OF ORIGINAL IMAGE DATA OR AFTER SIMPLE-AVERAGING
◆ PIXELS AFTER WEIGHTED-AVERAGING
◇ PIXELS AFTER WEIGHTED-AVERAGING WITH EDGING

PRIOR ART

IMAGE REDUCING DEVICE AND METHOD

BACKGROUND OF THE INVENTION

1. Field of the Invention

This invention relates to an image reducing device and a method, and more particularly to an image reducing device and an image reducing method that convert image data into smaller image data with less pixels by simple-averaging and weighted-averaging.

2. Description of Related Art

When an image captured by an electronic camera with a high resolution is to be displayed on a display with a low resolution, the original image data is reduced to smaller image data. The reduced image data is stored in a display memory, or the original image data is read from the display memory to be converted into the reduced image data.

Figure 7A:
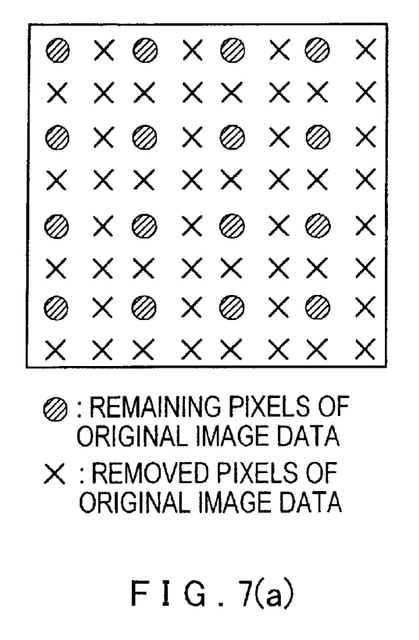
FIGS. 7(a), 7(b) and 7(c) are explanatory diagrams showing conventional image reducing methods by removal, simple-averaging and weighted-averaging, respectively.
Figure 7B:
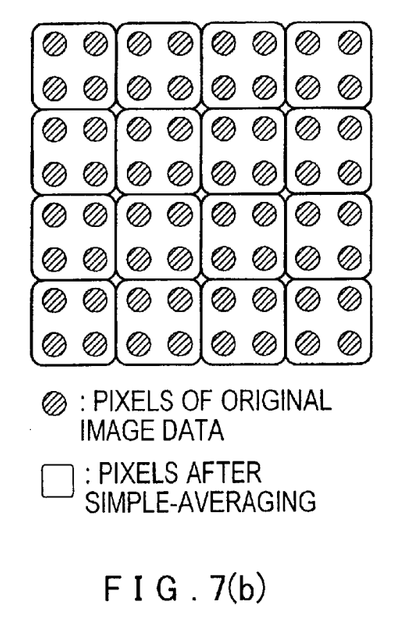
Figure 7C:
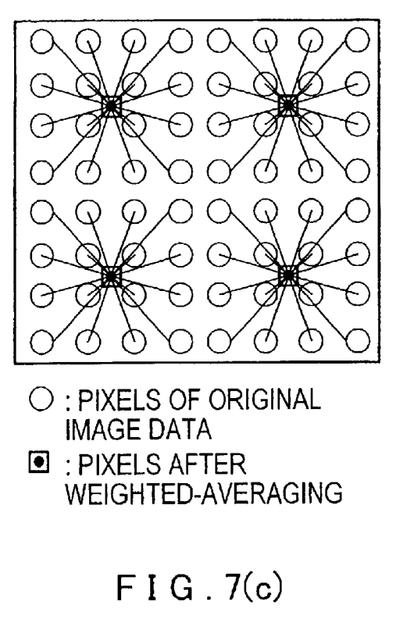

FIGS. 7(a), 7(b) and 7(c) show conventional image reducing methods. In FIG. 7(a), some of the pixels are removed. In FIG. 7(b), a simple average (arithmetic mean) of data of four adjacent pixels of each area is calculated to acquire a pixel of the reduced image data. In FIG. 7(c), a weighted average of data of pixels is calculated to acquire a pixel of the reduced image data.

However, in the first method, the reduced image is unclear. In the second method, the reduced image is blurred. In the third method, a memory with a large capacity is needed and much time is needed for calculation.

If some of the pixels of the original image data are removed before the simple-averaging or the weighted-averaging, the image is unclear like that in the first method.

Thus, the hardware and software may become overloaded in order to produce the reduced image data of high quality. In addition, edging is performed after the image data is reduced, and this lengthens the processing time.

SUMMARY OF THE INVENTION

It is therefore an object of the present invention to provide an image reducing device that can obtain a reduced image of high quality without overloading the hardware and software and also can perform edging at the same time, and an image reducing method.

To achieve the above object, the present invention provides an image reducing device that converts original image data into reduced image data with less pixels, the image reducing device comprising: a simple-averaging device that calculates a simple average of data of pixels of each simple-averaging area of the original image data to acquire a pixel of middle image data; and a weighted-averaging device that multiplies data of pixels of the middle image data that are adjacent to a pixel of the reduced image data by weight coefficients according to positions of the pixel of the reduced image data and the pixels of the middle image data to acquire the pixel of the reduce image data.

According to the present invention, the image reducing device comprises a simple-averaging device that calculates a simple average of the data of pixels of each simple-averaging area of the original image data to acquire a pixel of the middle image data, and a weighted-averaging device that multiplies the data of pixels of the middle image data that are adjacent to a pixel of the reduced image data by weight coefficients according to the positions of the pixel of the reduced image data and the pixels of the middle image data to acquire the pixel of the reduce image data. This can obtain a reduced image of high quality without overloading the software and hardware.

Further scope of applicability of the present invention will become apparent from the detailed description given hereinafter. However, it should be understood that the detailed description and specific examples, while indicating Preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
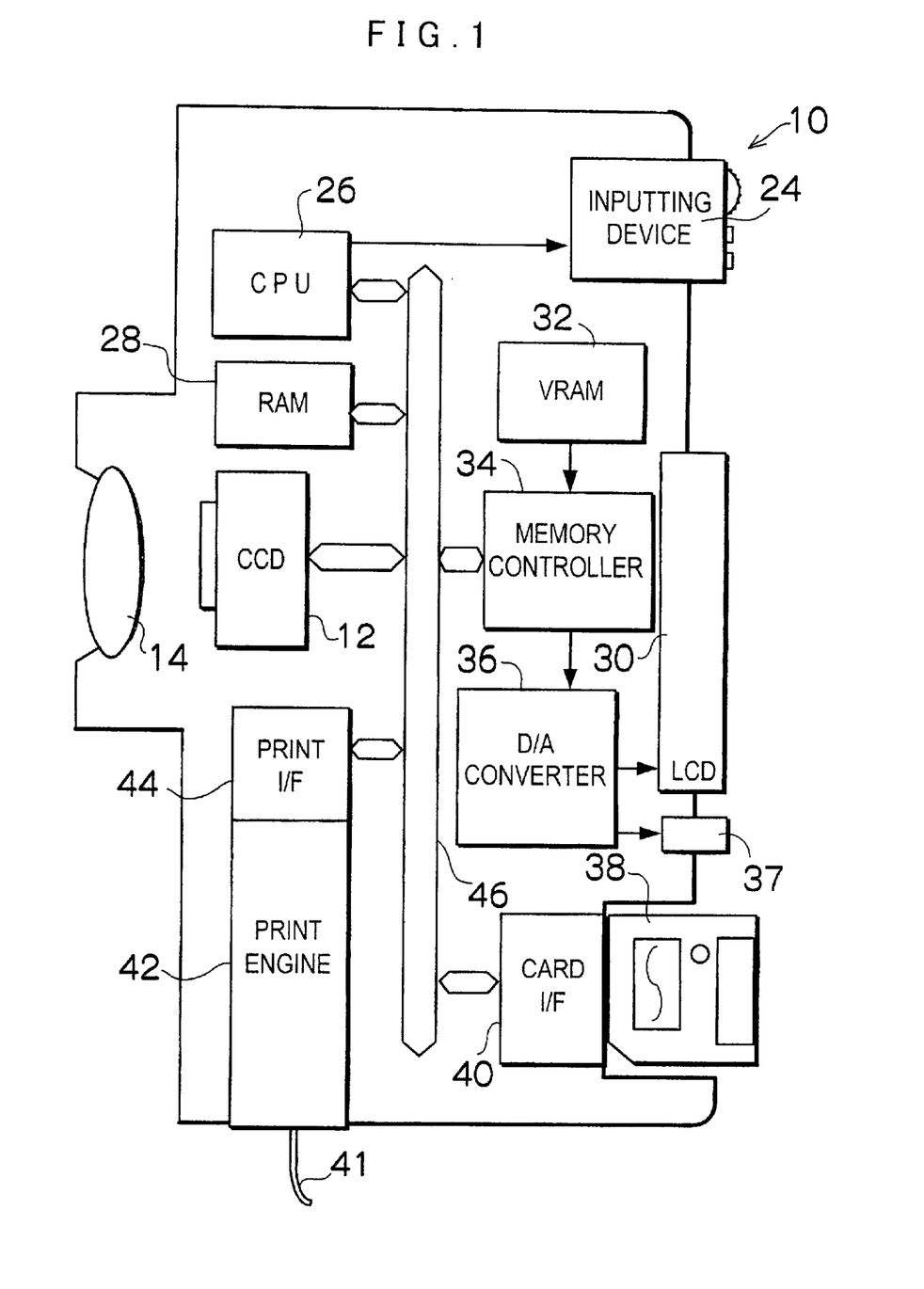
FIG. 1 is a block diagram of an image reducing device according to the present invention.

FIG. 1 is a block diagram of an image reducing device 10 according to the present invention.

The image reducing device 10 comprises a lens 14 that forms a subject image on an imaging device (CCD) 12; an inputting device 24 including a shutter release button, a mode selector, a cursor movement keys for moving a cursor displayed on a displaying device, an area selector, and a confirmation switch; an information processing device (CPU) 26 that processes a captured image, edits and reduces an image, and processes information on the state of the inputting device 24; a RAM 28 that is an operation area for the information processing device 26 operates and that temporarily stores image data at an image data reduction; the displaying device 30 such as an LCD that displays an image and inputted information; a VRAM 32 that stores image data of an image to be displayed on the displaying device 30 in real time; a memory controller 34 that reads and stores image data from and in the VRAM 32; a D/A converter 36 that converts digital image data read from the VRAM 32 into analog video signals and outputs the video signals to the displaying device 30; and an outputting device 37 that outputs the video signals to an external apparatus.

The image reducing device 10 also has a storage device 38 that stores captured image data, a card interface 40 that reads and stores image data from and in the storage device 38, a print engine 42 that prints an image on a sheet of paper 41, and a print interface 44 that controls the print engine 42. The information processing device 26, the RAM 28, the imaging device 12, the memory controller 34, the card interface 40 and the print interface 44 are connected to one another through a bus 46.

The operation of the image reducing device 10 will now be explained.

First, the user sets a "shooting" mode, and then the subject image formed on the imaging device 12 is converted into electric signals, which is temporarily stored in the RAM 28. The information processing device 26 performs automatic exposure (AE) and automatic focusing (AF) according to the image data stored in the RAM 28, and converts the image data into smaller image data with a resolution that is suitable for the displaying device 30. The converted image data is transmitted to a memory controller 34, and temporarily stored in the VRAM 32, and the image of the data is displayed on the displaying device 30.

The user focuses the image reducing device 10 on a subject, and determines a shooting angle, a subject distance and an exposure while looking at the image which is being displayed on the displaying device 30, and then pushes the shutter release button to record the image.

The image data is compressed, and the compressed data is stored in the storage device 38 through the card interface 40.

When the recorded image is to be reproduced, the user selects a "reproduction" mode. Then, file list data of the storage device 38 is read out, and the information processing device 26 converts the file list data into analog signals to display a file list on the displaying device 30. The user selects a desired image from the file list with the cursor movement keys and chooses the desired image with the confirmation switch.

After that, the information processing device 26 reads the image data from the storage device 38. The image data is decompressed and YC-converted, and the information processing device 26 converts the image data into smaller image data with the resolution that is suitable for the displaying device 30. Then, the reproduced image is displayed on the displaying device 30.

When an image is to be printed, a desired image file is selected and designated for printing. Then, the information processing device 26 converts the image data into smaller image data with a resolution that is suitable for the paper 41 and the print engine 42, and the print engine 42 prints the reduced image on the sheet of paper 41.

Figures 2A, 2B:
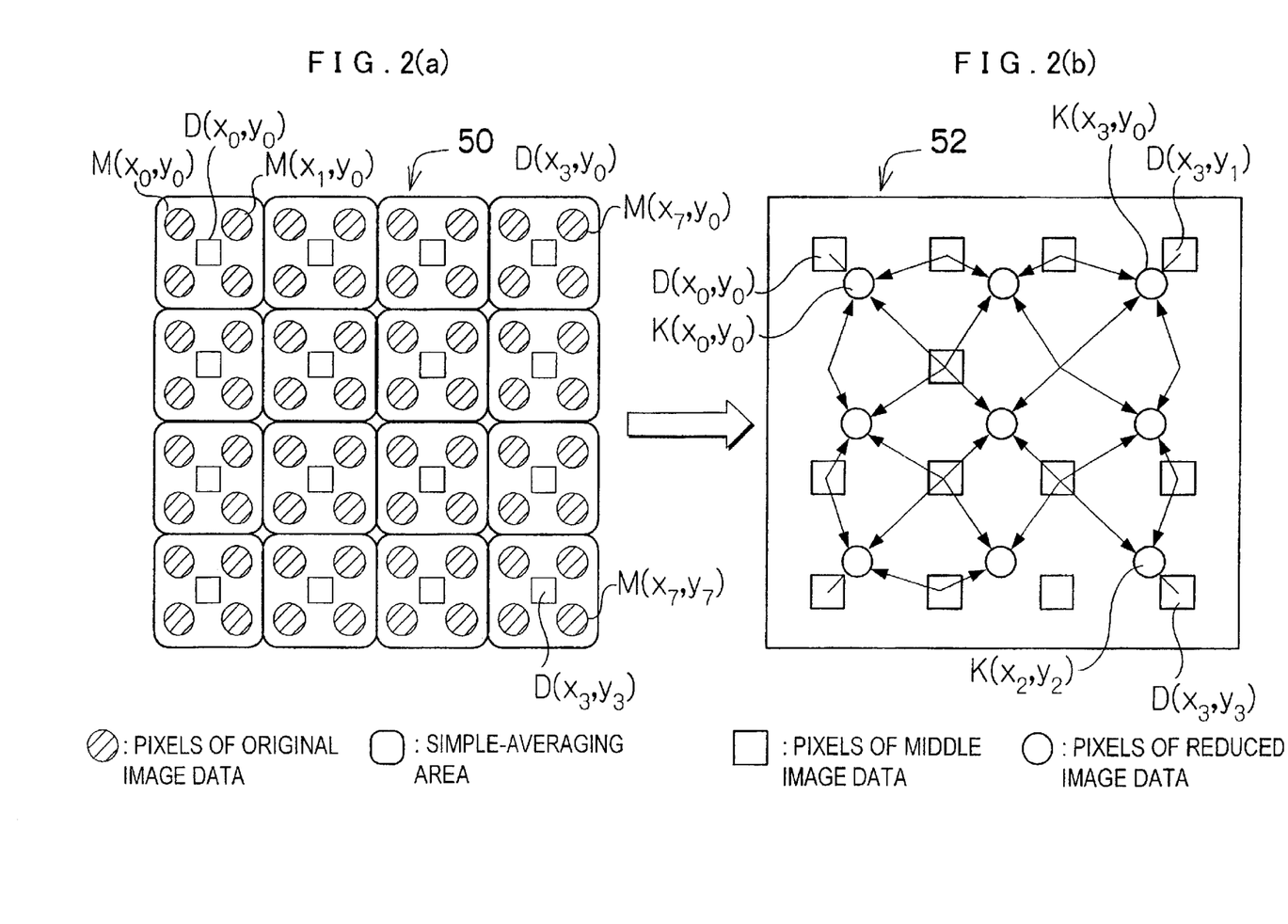
FIGS. 2(a) and 2(b) are explanatory diagrams showing simple-averaging and weighted-averaging of image reduction, respectively.

FIGS. 2($a$) and 2($b$) show the image reducing method according to the present invention.

As shown in FIG. 2($a$), let the pixels of original image data 50 captured or read from the storage device 38 be M ($x_0$, $y_0$), M ($x_1$, $y_0$), . . . , M ($x_7$, $y_7$). The information processing device 26 calculates the simple averages of brightnesses for the three primary colors (R, G and B) of four adjacent pixels (each simple-averaging area) of the original image data 50 to acquire a pixel of middle image data.

For example, a pixel D ($x_0$, $y_0$) of the middle image data is acquired from the pixels M ($x_0$, $y_0$), M ($x_1$, $y_0$), M ($x_0$, $y_1$) and M ($x_1$, $y_1$) of the original image data 50. The information processing device 26 acquires the middle image data with the pixels D ($x_0$, $y_0$), . . . , D ($x_3$, $y_3$) in this way. The information processing device 26 does not have to calculate very much since it only calculates the totals of the brightnesses and divides the totals by four (eliminates the last two bits).

After that, as shown in FIG. 2($b$), the information processing device 26 calculates the weighted averages of brightnesses or densities for the three primary colors (R, G and B) of four adjacent pixels of the middle image data to acquire a pixel of reduced image data.

For example, a pixel K ($x_0$, $y_0$) of the reduced image data is acquired from the pixels D ($x_0$, $y_0$), D ($x_1$, $y_0$), D ($x_0$, $y_1$) and D ($x_1$, $y_1$) of the middle image data. In FIG. 2($b$), the information processing device 26 acquires the reduced image data with the pixels K ($x_0$, $y_0$), . . . , K ($x_2$, $y_2$) in this way, and the numbers of horizontal and vertical pixels are each reduced by 25%.

Figure 3:
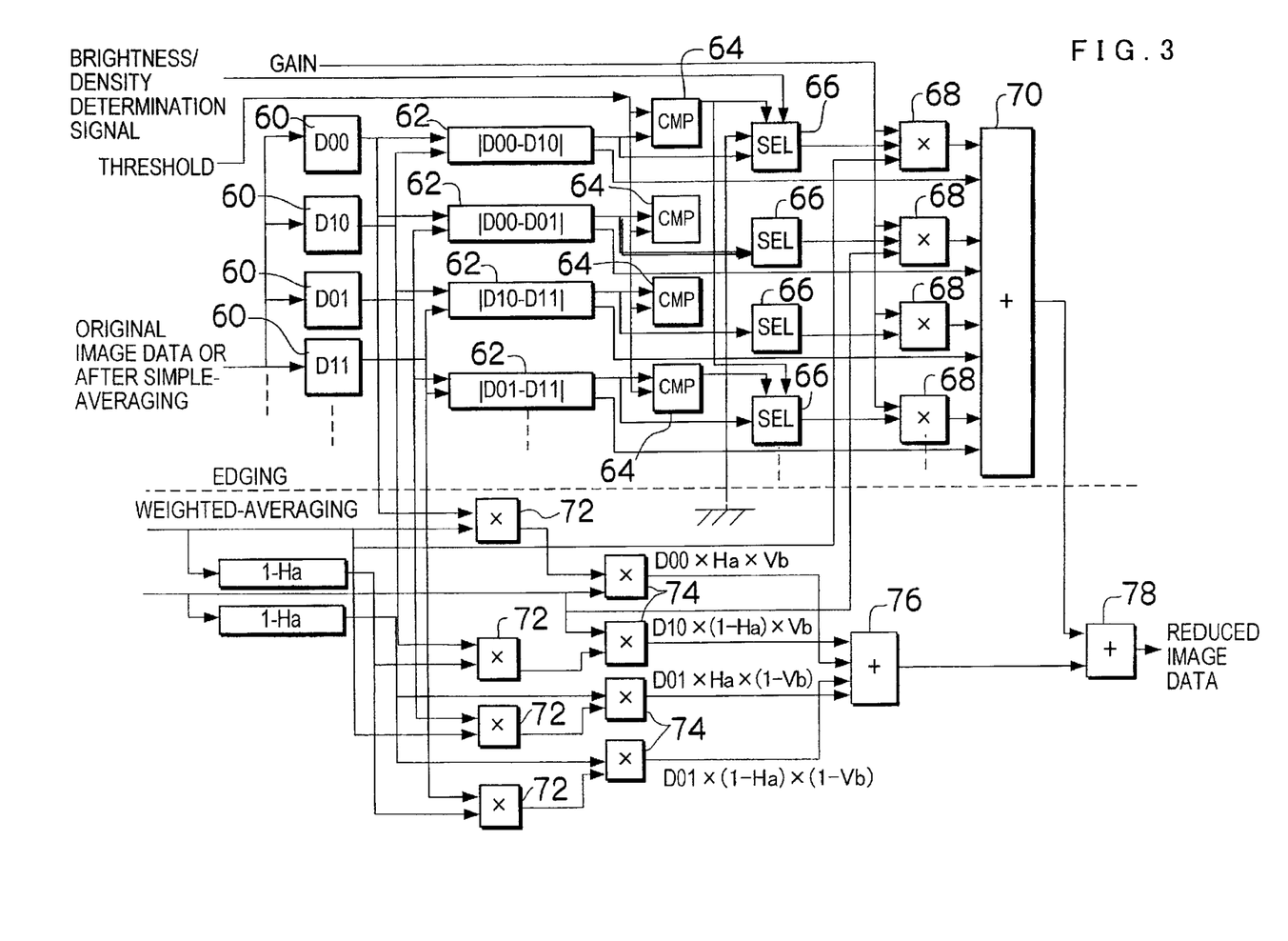
FIG. 3 is a block diagram showing the image reducing method including the weighted-averaging and edging.

FIG. 3 shows the image reducing method including weighted-averaging and edging. A pixel D ($x_n$, $y_m$) of the original image data or the middle image data will be referred to as a pixel $D_{nm}$.

An edging device above a dotted line comprises pixel dividing devices 60 that output the brightnesses or densities of the pixels $D_{00}$, $D_{01}$, $D_{10}$, $D_{11}$, . . . , subtracting devices 62 that calculate the differences between the brightnesses or densities of the adjacent pixels, comparing devices 64 that compare the differences with a predetermined threshold, selectors 66 that output the differences or 0 according to the comparison results and brightness/density determination signals, multiplying devices 68 that multiply the differences or 0 by a gain and multiply the products by a horizontal ratio (a ratio of a horizontal difference between pixels $D_{nm}$ and $K_{nm}$ to that between pixels $D_{nm}$ and $D_{(n+1)m}$) or a vertical ratio (a ratio of a vertical difference between pixels $D_{nm}$ and $K_{nm}$ to that between pixels $D_{nm}$ and $D_{n(m+1)}$), and an adding devices 70 that adds up the products and the differences.

A weighted-averaging device below the dotted line comprises horizontal multiplying devices 72 that multiply the brightnesses or densities by a horizontal ratio Ha (a ratio of a horizontal difference between pixels $D_{00}$ and $K_{00}$ to that between pixels $D_{00}$ and $D_{10}$) or a remainder (1−Ha), vertical multiplying devices 74 that multiply the products by a vertical ratio Vb (a ratio of a vertical difference between pixels $D_{00}$ and $K_{00}$ to that between pixels $D_{00}$ and $D_{01}$) or a remainder (1−Vb), an adding device 76 that adds up the outputs from the vertical multiplying devices 74, and an adding device 78 that add the output from the adding devices 70 to that from the adding device 76.

If the differences between the brightnesses or densities are larger than the threshold, the selectors 66 output the differences to perform the edging. If the differences between the brightnesses or densities are smaller than the threshold, the selectors 66 output 0 to prevent an increase of noises.

The threshold and the gain may be able to change. In addition, the selectors 66 may output the differences when at least one of the differences exceeds the threshold or all the differences exceed the threshold.

The brightnesses or densities of the pixel $K_{00}$ are shown by the following equation 1, $$K_{00} = D_{00} \times Ha \times Vb + D_{01} \times Ha \times (1-Vb) + D_{10} \times (1-Ha) \times Vb + D_{11} \times (1-Ha) \times (1-Vb). \quad \text{equation 1}$$

Brightnesses or densities of the pixel $K_{00}$ after the edging are shown by the following equation 2, $$K'_{00} = K_{00} \pm |D_{00} - D_{01}| \times A_{00} \pm |D_{00} - D_{10}| \times A_{10} \pm |D_{01} - D_{10}| \times A_{01} \pm |D_{10} - D_{11}| \times A_{11}. \quad \text{equation 2}$$

In this method, the production of the reduced image data and the edging can be performed at one time.

Figure 4:
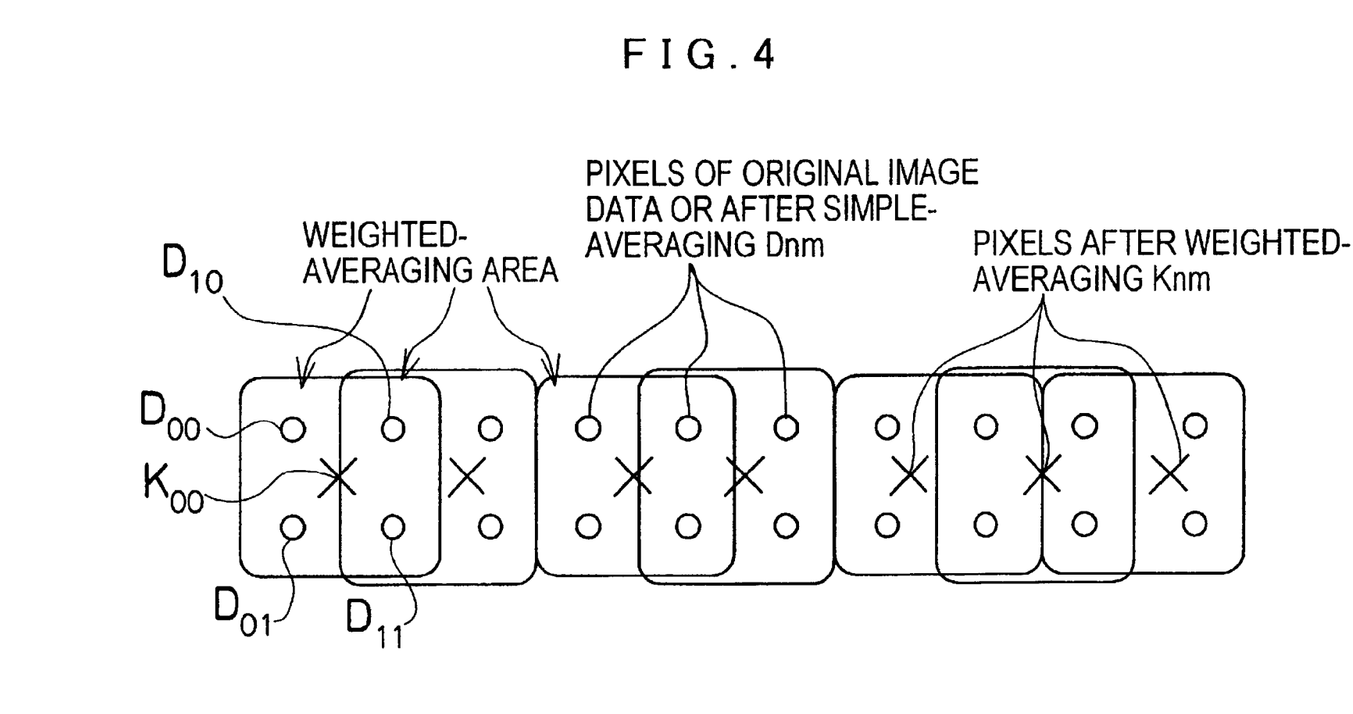
FIG. 4 is an explanatory diagram showing the image reducing method including the weighted-averaging and the edging.

FIG. 4 is an explanatory diagram showing the image reduction by the above calculation.

For convenience, the pixels $D_{nm}$ in and after the third row of the original image data or the middle image data are not shown in FIG. 4. In FIG. 4, the pixel $K_{00}$ is in the center of a weighted-averaging area including the pixels $D_{00}$, $D_{01}$, $D_{10}$ and $D_{11}$, and the reduction rate is approximately 0.7.

Figure 5:
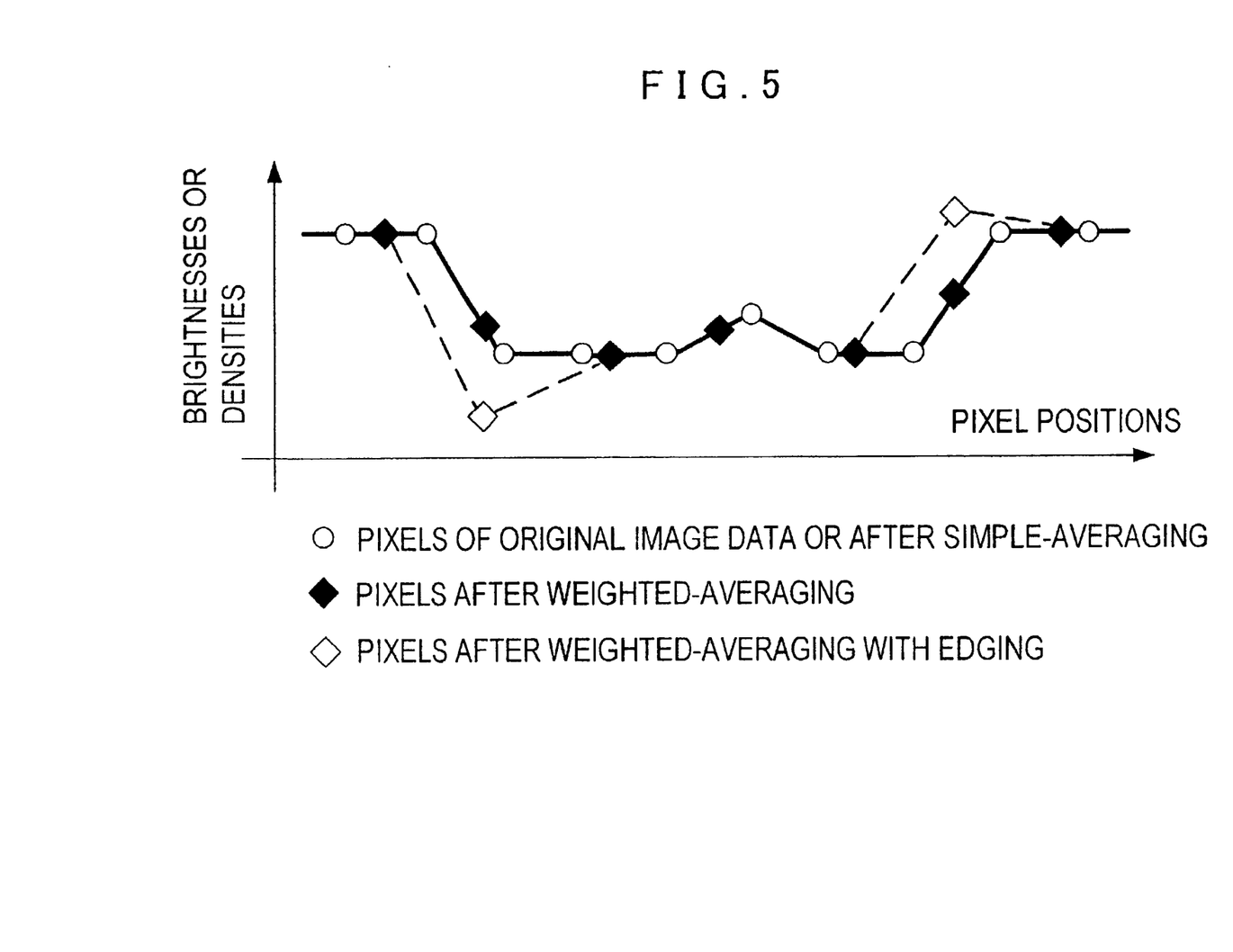
FIG. 5 is a graph diagram showing brightnesses or densities of the pixels of original image data or middle image data, after the weighted-averaging, and after the weighted-averaging with the edging.

FIG. 5 shows the brightnesses or densities of the pixels of the original image data or the middle image data, after the weighted-averaging, and after the weighted-averaging with the edging.

The marked points of the pixels of the original image data or the middle image data and those after the weighted-averaging are on the same curve. The edging are performed for parts where the brightnesses or densities largely change.

In this method, the weighted-averaging and the edging are performed after the number of pixels are reduced by the simple-averaging, and this shortens the calculation time and this can obtain the reduced image of high quality without overloading the software and hardware.

Figure 6:
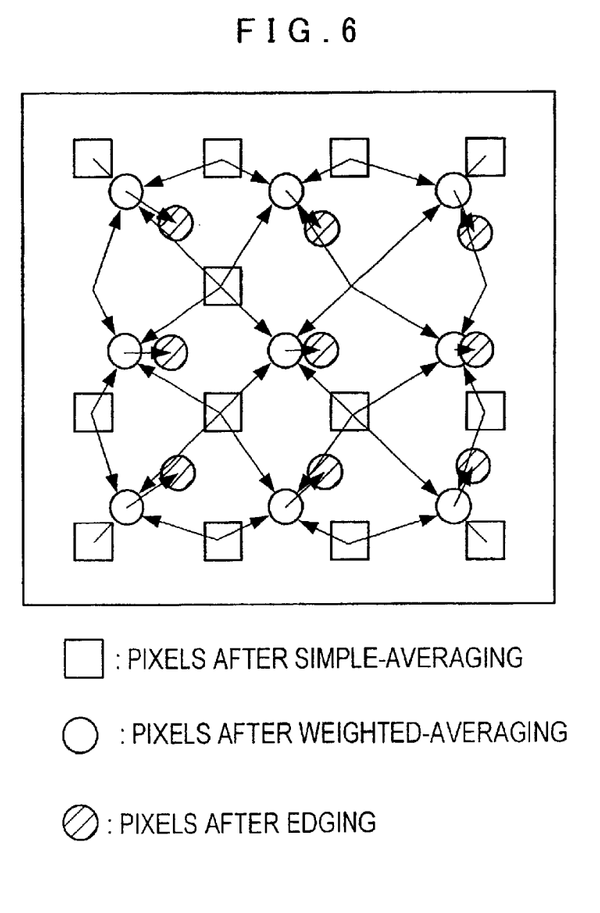
FIG. 6 is an explanatory diagram showing the pixels of the original image data or the middle image data, after the weighted-averaging, and after the weighted-averaging with the edging.

FIG. 6 is an explanatory diagram showing the pixels of the original image data or the middle image data, after the weighted-averaging, and after the weighted-averaging with the edging.

The pixels after the weighted-averaging with the edging are different from those after the weighted-averaging.

In the embodiment, 1800×1200 pixels of the original image data are divided into 900×600 simple-averaging areas, and the simple average of the data of four pixels of each simple-averaging area is calculated to acquire a pixel of the middle image data. The number of pixels after the simple-averaging needs to be a quarter of that of the original image data or less. The weighted average of the data of four adjacent pixels is calculated to acquire a pixel of the reduced image data, and the number of pixels of the reduce image data is, for example, 640×480 that is suitable for the display and so on. In case, the number of pixels for the display is a quarter of that of the original image data or more, only the weighted-averaging is performed.

The original image data to be reduced according to the present invention is not limited to raw image data that is captured with the CCD or read from the storage device. After the raw image data is reduced according to a conventional reduction method into intermediately-reduced image data, the intermediately-reduced image data may be regarded as original image data to be reduced according to the present invention. That is, the present invention can be also utilized to reduce the intermediately-reduced image data. For example, the raw image data of 1800×1200 pixels is reduced according to the conventional reduction method into the intermediately-reduced image data of 1280×1024 pixels, and the intermediately-reduced image data of 1280×1024 pixels regarded as the original image is reduced according to the present invention into the reduced image data of 640×480 pixels.

According to the present invention, the image reducing device comprises a simple-averaging device that calculates the simple average of the data of pixels of each simple-averaging area of the original image data to acquire a pixel of the middle image data, and a weighted-averaging device that multiplies the data of pixels of the middle image data that are adjacent to a pixel of the reduced image data by weight coefficients according to the positions of the pixel of the reduced image data and the pixels of the middle image data to acquire the pixel of the reduce image data. In this method, the weighted-averaging is performed after the number of pixels are reduced by the simple-averaging, and this can obtain the reduced image of high quality without overloading the software and hardware. In addition, the edging can be easily performed at the same time as the weighted-averaging.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image reducing device that converts image data of one original image into image data of a reduced image with less pixels, said image reducing device comprising:

a simple-averaging device that calculates a simple average of image data of a plurality of pixels of each simple-averaging area of the image data of the one original image to acquire a plurality of pixels of image data of a single middle image of each simple-averaging area; and a weighted-averaging device that multiplies the image data of the plurality of pixels of the single middle image that are adjacent to a pixel of the image data of the reduced image by weight coefficients according to positions of the pixel of the image data of the reduced image and the image data of the plurality of pixels of the single middle image to acquire the image data of the reduced image.

2. The image reducing device as defined in claim 1, further comprising:

a subtracting device that calculates differences of image data of adjacent pixels of the single middle image;

a multiplying device that multiplies the differences by an edging coefficient according to the differences; and an adding device that adds the products to the image data of the pixels of the reduced image.

3. The image reducing device as defined in claim 2, further comprising a selector that outputs the edging coefficient to the multiplying device only when the differences are at least a predetermined threshold.

4. The image reducing device as defined in claim 1, wherein the number of the pixels of each simple-averaging area is at least four.

5. The image reducing device as defined in claim 4, further comprising:

a subtracting device that calculates differences of image data of adjacent pixels of the single middle image;

a multiplying device that multiplies the differences by an edging coefficient according to the differences; and an adding device that adds the products to the image data of the pixels of the reduced image.

6. The image reducing device as defined in claim 5, further comprising a selector that outputs the edging coefficient to the multiplying device only when the differences are at least a predetermined threshold.

7. The image reducing device as defined in claim 1, further comprising at least one of the following:

a reading device that reads the image data of the one original image from a storage medium; and an imaging device that captures the image data of the one original image.

8. The image reducing device as defined in claim 1, further comprising at least one of the following:

an outputting device that outputs the image data of the reduced image to an external apparatus;

a displaying device that displays the reduced image; and a printing device that prints the reduced image data.

9. An image reducing method of converting image data of one original image into image data of a reduced image with less pixels, said image reducing method comprising the steps of:

calculating a simple average of image data of a plurality of pixels of each simple-averaging area of the image data of the one original image to acquire a plurality of pixels of image data of a single middle image; and multiplying the image data of the plurality of pixels of the single middle image that are adjacent to a pixel of the image data of the reduced image by weight coefficients according to positions of the pixel of the reduced image and the image data of the plurality of pixels of the middle image to acquire the image data of the reduce image.

10. The image reducing method as defined in claim 9, further comprising the steps of:

calculating differences of image data of adjacent pixels of the single middle image;

multiplying the differences by an edging coefficient according to the differences; and adding the products to the image data of the pixels of the reduced image.

11. The image reducing device as defined in claim 1, wherein a difference in the positions between the pixels of the image data of the reduced image and the image data of the single middle image is considered by the weighted-averaging device to acquire the image data of the reduced image.

12. The image reducing method as defined in claim 9, further comprising the step of considering a difference between the pixels of the image data of the reduced image and the image data of the single middle image to acquire the image data of the reduced image.

* * * * *